United States Patent
Peng et al.

(10) Patent No.: US 10,505,475 B1
(45) Date of Patent: Dec. 10, 2019

(54) DRIVING METHOD FOR SINGLE-PHASE DC BRUSHLESS MOTOR USING SENSOR ONLY IN START-UP

(71) Applicant: TRITAN TECHNOLOGY INC., Hsinchu County (TW)

(72) Inventors: Sheng-Yu Peng, Hsinchu County (TW); Pi-Cheng Chen, Hsinchu County (TW); Shun-Sheng Cheng, Hsinchu County (TW); Shao-Hua Cheng, Hsinchu County (TW); Huang-Jen Wang, Hsinchu County (TW)

(73) Assignee: TRITAN TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 16/185,058

(22) Filed: Nov. 9, 2018

(51) Int. Cl.
*H02P 6/26* (2016.01)
*H02P 6/22* (2006.01)
*H02P 6/16* (2016.01)

(52) U.S. Cl.
CPC .................. *H02P 6/22* (2013.01); *H02P 6/16* (2013.01); *H02P 6/26* (2016.02); *H02P 2203/05* (2013.01)

(58) Field of Classification Search
None
See application file for complete search history.

(56) References Cited

U.S. PATENT DOCUMENTS

| 10,116,244 B2 * | 10/2018 | Kumazawa | ............. H02P 1/029 |
| 2003/0123178 A1 * | 7/2003 | Gotou | ....................... H02P 6/22 318/400.11 |
| 2015/0162860 A1 * | 6/2015 | Bian | ........................ H02P 6/16 318/400.07 |

* cited by examiner

*Primary Examiner* — Bentsu Ro
(74) *Attorney, Agent, or Firm* — Lin & Associates Intellectual Property, Inc.

(57) ABSTRACT

The invention discloses a driving method for single-phase DC brushless motor using sensor only in start-up, comprising: power-up to activate a motor control circuit of a motor; confirming whether the motor is in a rotating state before activation of an excitation? If not, executing a static start-up procedure of using a sensor to detect magnetic poles of the rotor; calculating slope of the BEMF signal to determine the rotation direction of the motor; determining whether the rotation direction of the motor conforming to a predetermined direction; if yes, executing a normal driving procedure; otherwise, executing the static start-up procedure of using a sensor to detect magnetic poles of the rotor. The invention utilizes the present invention utilizes an asymmetric magnetic field caused by a mechanism between a rotor and a stator of a motor to induce a back electromotive force signal and a sensor detection to control rotation direction.

10 Claims, 8 Drawing Sheets

DRIVING METHOD FOR SINGLE-PHASE DC BRUSHLESS MOTOR USING SENSOR ONLY IN START-UP

TECHNICAL FIELD

The technical field generally relates to a driving method for single-phase direct current (DC) brushless motor, in particularly, to a method for controlling rotation direction by using a sensor or using BEMF of the asymmetrical magnetic field caused by the mechanism design between the rotor and the stator of a motor.

BACKGROUND

A typical direct current (DC) brushless motor drive may use a position sensing device, such as, a Hall effect or an optical sensor, to detect the instantaneous position of its rotor and thereby control the electronic switch to perform direction change. As the majority uses a Hall device to detect the position of the rotor, and the sensitivity of the Hall device is positively proportional to the induced intensity of the external magnetic field, the Hall device is easily subjected to interference and the high temperature. In particular, when the motor rotates at a high speed, due to the hysteresis effect, the sensor signal will directly affect the precision of the driver on the phase changing control, which, in turn, affects the performance of the control on the position and speed of the closed circuit. To increase the precision of the sensor will also increase the production cost. Moreover, the placement of the sensor inside the motor is also an important factor determining the performance. An unprecise placement will result in erroneous detection signal, which causes unexpected motor operation. Therefore, much efforts have been devoted to eliminate the above situations of position sensors in the brushless motor driving.

Therein, the back electromotive force (BEMF) signal is most commonly used in the sensorless motor technology. Since the BEMF varies according to the position and rotational speed of the rotor, the BEMF signal is used to determine the actual position of the rotor. However, the sensorless technology is mostly used for three-phase DC brushless motor drive. The main reason is that the three-phase drive motor is only turned on at two points at any single time, and therefore the other point can be used as BEMF signal measurement. Once the motor begins to rotate, the rotor position can be detected through the inductive BEMF on the stator winding. By processing these BEMF signals, in addition to determining the actual position of the rotor, it is also possible to control the switching of the excitation current of the respective stator winding coils for commutation. On the other hand, since there is no available effective BEMF signal measurement method for single-phase DC brushless motors, no suitable technology solution to solve the above-mentioned problems associated with the use of position sensors is proposed so far.

SUMMARY

The present invention utilizes sensor for detecting the location of the rotor at start-up and then utilizes an unbalanced (asymmetric) magnetic field caused by a mechanism design between a motor rotor and a stator to induce a back electromotive force signal (BEMF) for rotation state determination during subsequent rotation, to solve the interference problem of a single-phase DC brushless motor with sensor, to solve the problem wherein the sensorless single-phase DC brushless motor in the prior art cannot ensure the starting rotation in the fixed direction.

An embodiment of the present invention provides a driving method for single-phase DC brushless motor using sensor only in start-up, comprising the following steps:

Step S101: powering up to activate a motor control circuit of a motor;

Step S102: confirm whether the motor is in a rotating state before activation of an excitation? If yes, proceed to step S103; otherwise, executing a static start-up procedure of using a sensor to detect magnetic poles of the rotor;

Step S103: calculating a slope of the BEMF signal to determine the rotation direction of the motor;

Step S104: determining whether the rotation direction of the motor conforming to a predetermined direction; if yes, executing a normal driving procedure; otherwise, executing the static start-up procedure of using a sensor to detect magnetic poles of the rotor.

In a preferred embodiment, the static start-up procedure further comprises the following steps:

Step S110: discharging remnant energy;

Step S111: confirming that the motor having no remnant energy; if yes, executing step S112; otherwise, returning to step S110; Step S112: performing a first phase (PH1) excitation or a second phase (PH2) excitation of the motor according to the sensor detection of phase of the rotor;

Step S113: confirming an expected commutation of BEMF occurring; if so executing step S114; otherwise, executing step S115;

Step S114: confirming the first phase excitation before commutation, according to a result performing an excitation corresponding to the normal driving procedure;

Step S115: confirming whether exceeding a predetermined waiting time; if yes, return to step S110; otherwise, return to step S113.

In a preferred embodiment, the sensor is a Hall device.

In a preferred embodiment, the normal driving procedure further comprises the following steps:

Step S120: waiting for commutation;

Step S121: performing first phase excitation;

Step S122: waiting for commutation;

Step S123: performing second phase excitation.

In a preferred embodiment, the driving method for single-phase DC brushless motor using sensor only in start-up may further comprises: extracting a first phase or a second phase BEMF signal periodically in the normal driving procedure, and determining a slope of the BEMF signal to determine the rotation direction of the motor.

In summary, the driving method for single-phase DC brushless motor using sensor only in start-up disclosed in the present invention utilizes a sensor constituted of Hall device during the motor start-up procedure, during which the motor is stationary and the magnetic pole signal sensed by the Hall device is at the strongest point for anti-interference to completely avoid the interference problem caused during rotation in prior art. Also, the Hall device is only for positioning the magnetic pole of the stationary rotor, and the placement precision is not an issue as well as the device sensitivity. Therefore, the cost is reduced. Then, during rotation, the present invention utilizes an unbalanced (asymmetric) magnetic field caused by a mechanism design between a motor rotor and a stator to induce BEMF for rotation state determination during subsequent rotation, to solve the interference problem of a single-phase DC brushless motor with sensor, to solve the problem wherein the sensorless single-phase DC brushless motor in the prior art cannot ensure the starting rotation in the fixed direction.

Once the rotation of the motor enters the normal driving procedure, the Hall device signal is no longer needed, and the hysteresis effect on the sensor during high speed rotation is also eliminated.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
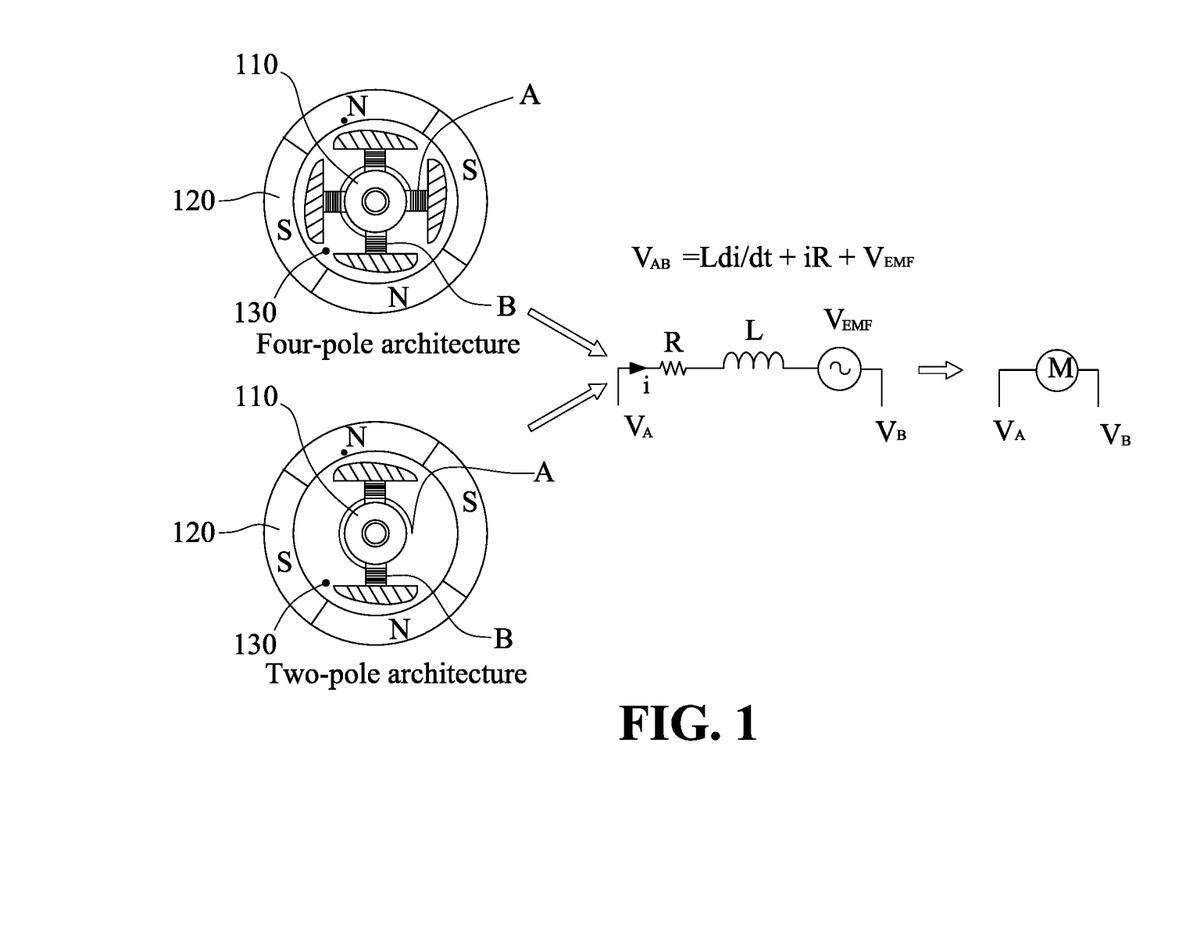
FIG. 1 shows a schematic view of the structure of a single-phase DC brushless motor and an equivalent circuit thereof applicable to the present invention.

FIG. 1 shows a schematic view of the structure of a single-phase DC brushless motor and an equivalent circuit thereof applicable to the present invention. As shown in FIG. 1, a single-phase brushless DC motor mainly comprises: a stator 110, a rotor 120 composed of permanent magnets, and a sensor 130 composed of a Hall device; the rotor 120 and the stator 110 may be two poles, four poles, or six poles, and so on. The Hall device is for detecting the magnetic pole signals of the rotor 120. FIG. 1 shows the architecture of two poles and four poles. The single-phase DC brushless motor comprises two motor terminals A and B, and as shown in FIG. 1, $V_A$ and $V_B$ represent voltage values at the motor terminals A and B, respectively. The equivalent circuit is represented by a resistor R, an inductor L, and a voltage source $V_{EMF}$, in other words, $V_{AB}=Ldi/dt+iR+V_{EMF}$; wherein the voltage source $V_{EMF}$ is the induced back electromotive force.

It should be noted that, as shown in FIG. 1, the mechanism between the rotor 120 and the stator 110 of the motor is designed to create an unbalanced (asymmetric) magnetic field. The present invention utilizes the asymmetric magnetic field to sense a counter electromotive force signal to determine whether the motor is in a rotating state and rotation direction thereof.

Figure 2:
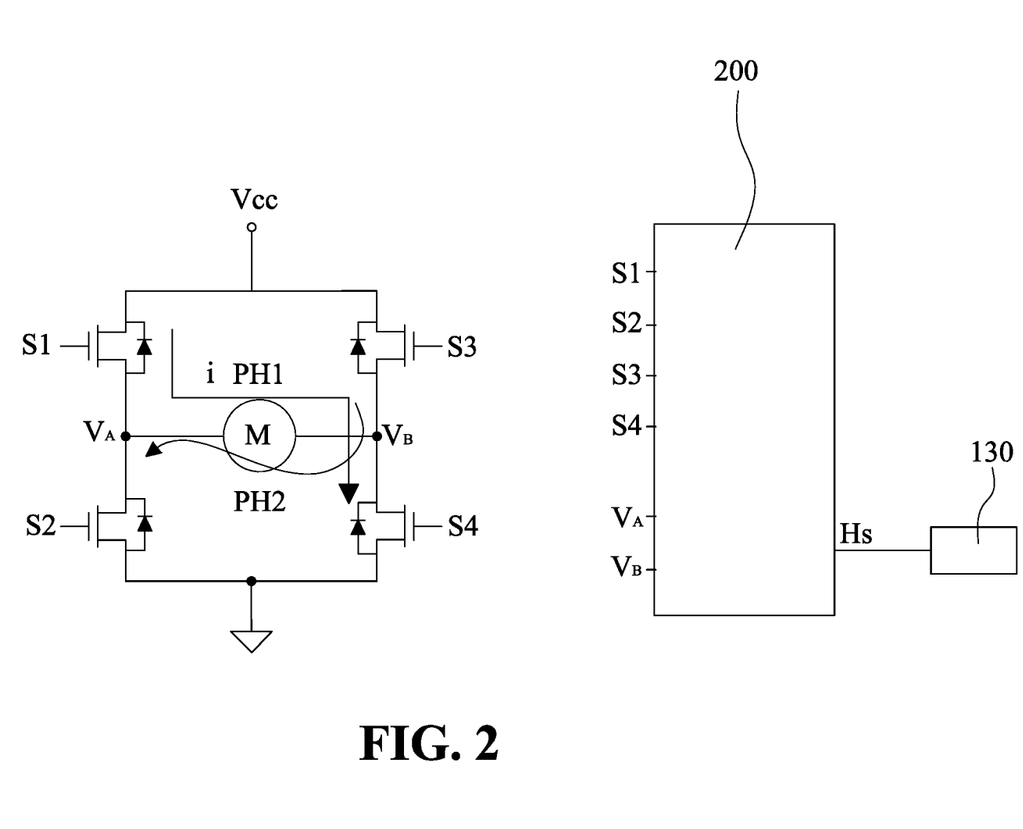
FIG. 2 shows a schematic view of the single-phase DC brushless motor and the control circuit according to the present invention.

FIG. 2 shows a schematic view of the single-phase DC brushless motor and the control circuit according to the present invention. As shown in FIG. 2, the control circuit of the single-phase DC brushless motor comprises a first switch S1, a second switch S2, a third switch S3, a fourth switch S4, and a controller 200; wherein the first switch S1 and the second switch S2 are connected in series, the third switch S3 and the fourth switch S4 are connected in series, and the series connection points are electrically connected to the two terminals (A, B) of the single-phase DC brushless motor respectively. The controller 200 respectively controls the first switch S1, the second switch S2, the third switch S3, and the fourth switch S4 by providing a first switch control signal, a second switch control signal, a third switch control signal, and a fourth switch control signal. The controller 200 also provides two excitation voltages $V_A$, $V_B$ to the two terminals A, B of the single-phase DC brushless motor.

It should be noted that FIG. 2 also defines a first phase PH1 and a second phase PH2; wherein the first phase and the second phase respectively mean two configurations of the voltage difference between the terminals A and B of the single-phase DC brushless motors, that is, $V_A>V_B$, and $V_A<V_B$. For convenience of explanation, the following description defines the first phase as $V_A$>VB and the second phase as $V_A<V_B$. However, in other embodiments, the first phase may also be defined as $V_A<V_B$ and the second phase as $V_A>V_B$. The configuration of $V_A=V_B$ represents a commutation.

Figure 3A:
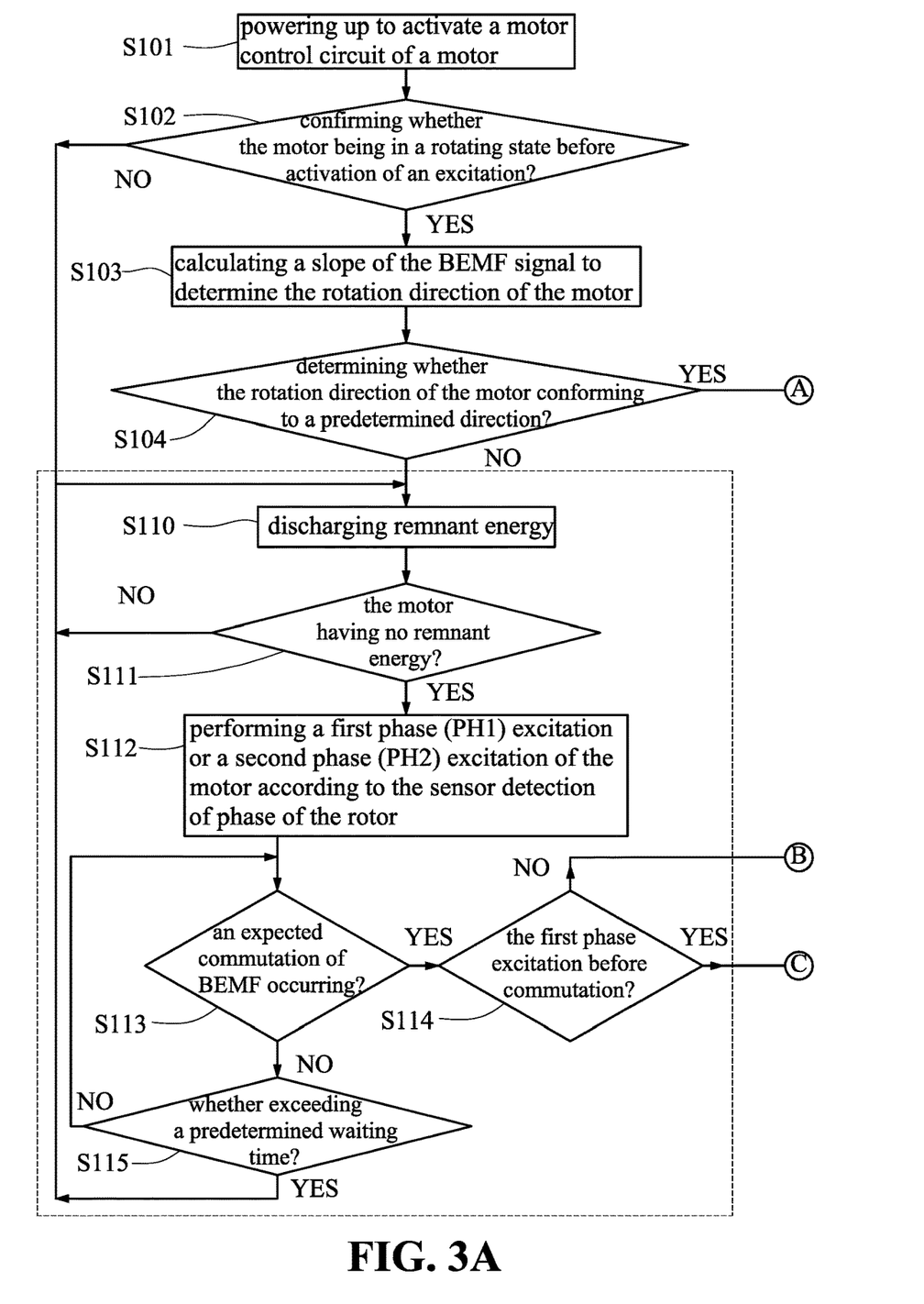
FIGS. 3A-3B show a schematic view of the flowchart of the driving method for single-phase DC brushless motor using sensor only in start-up of the present invention.
Figure 3B:
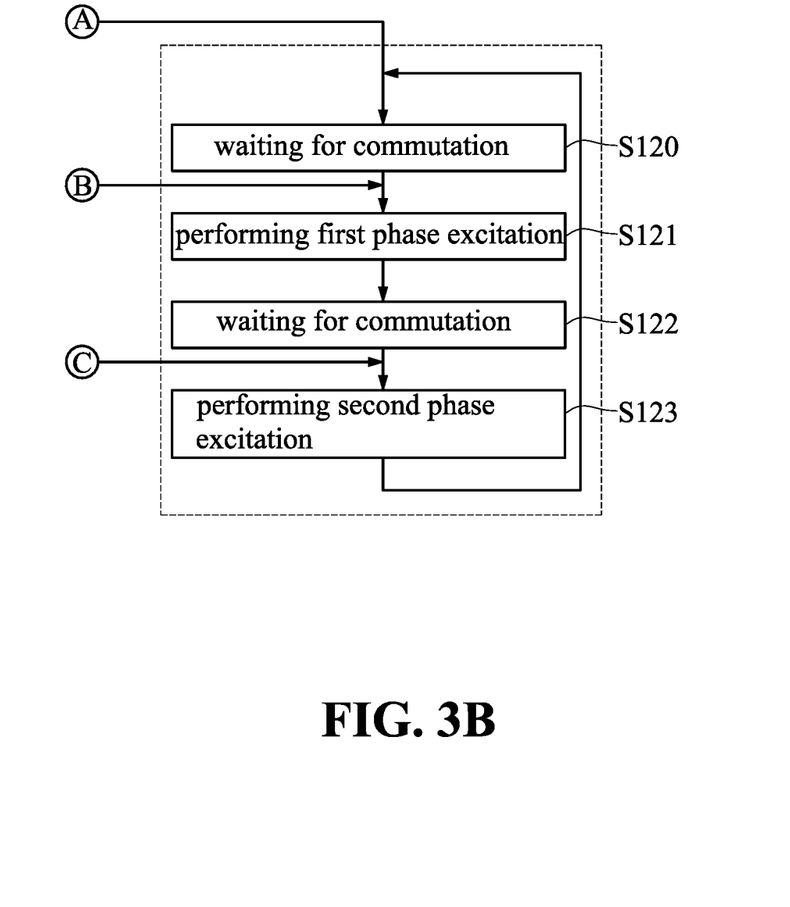

Based on the above control circuit, the present invention provides a driving method for single-phase DC brushless motor using sensor only in start-up. FIGS. 3A-3B show a schematic view of the flowchart of the driving method for single-phase DC brushless motor using sensor only in start-up of the present invention, comprising the following steps:

Step S101: powering up to activate a motor control circuit of a motor;

Step S102: confirm whether the motor is in a rotating state before activation of an excitation? If yes, proceed to step S103; otherwise, executing a static start-up procedure of using a sensor to detect magnetic poles of the rotor;

Step S103: calculating a slope of the BEMF signal to determine the rotation direction of the motor;

Step S104: determining whether the rotation direction of the motor conforming to a predetermined direction; if yes, executing a normal driving procedure; otherwise, executing the static start-up procedure of using a sensor to detect magnetic poles of the rotor.

It should be noted that the single-phase DC brushless motor may be in a rotating state prior to the official excitation (power-on activation) procedure, for example, in a reversal rotation state in a returning wind environment, or in a forward rotation state due to residual kinetic energy or in a downwind state; therefore, the method of the present invention must detect whether the single-phase DC brushless motor is in a rotating state after starting the control circuit (step S102).

In an actual application, whether the induced BEMF (the terminal voltage difference between $V_A$ and $V_B$) is greater than a predetermined threshold can be measured. If the terminal voltage difference between $V_A$ and $V_B$ is greater than the predetermined threshold, the motor may be determined to be in a rotating state, then step S103 is performed to calculate a slope of the BEMF signal to determine the rotation direction of the motor; otherwise, the motor is in a stationary state, so performing a static start-up procedure.

Figure 4:
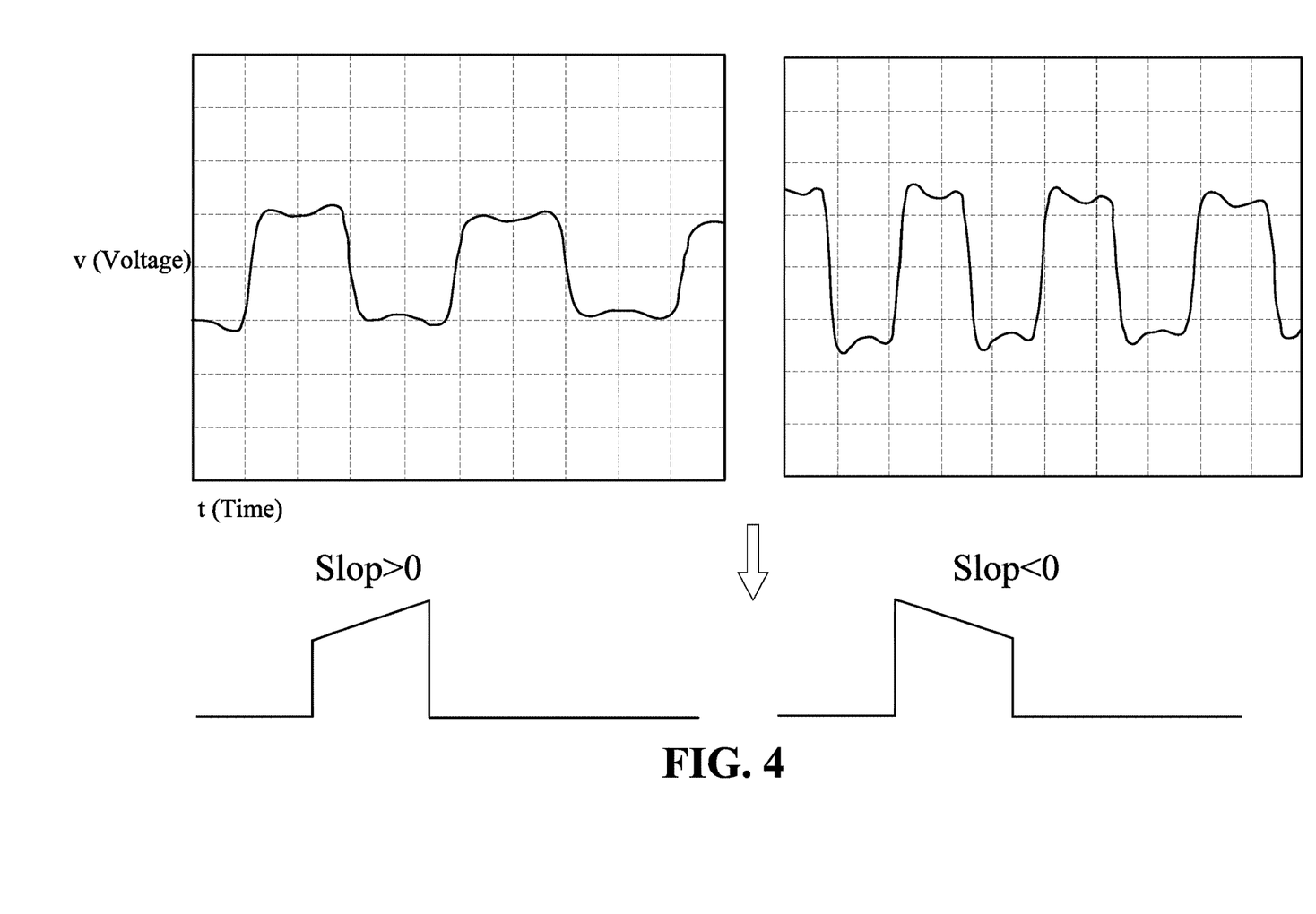
FIG. 4 shows a schematic view of the slope of the BEMF signal waveform in the driving method for single-phase DC brushless motor using sensor only in start-up of the present invention.

In step S103, the specific manner of determining the rotation direction of the motor is by calculating the slope of the back electromotive force signal. As the back electromotive force signal waveform shown in FIG. 4, when the left peak is lower than the right peak, the back electromotive force signal slope is positive, indicating that the rotation direction is clockwise; conversely, when the left peak is higher than the right peak, the slope of the back electromotive force signal is negative, indicating that the direction of rotation is counterclockwise.

In step S104, when the motor rotation direction conforms to the predetermined direction, the motor rotation may be continuously driven by continuing to execute a normal driving procedure; otherwise, the static start-up procedure is performed to adjust the rotation direction.

Figure 5:
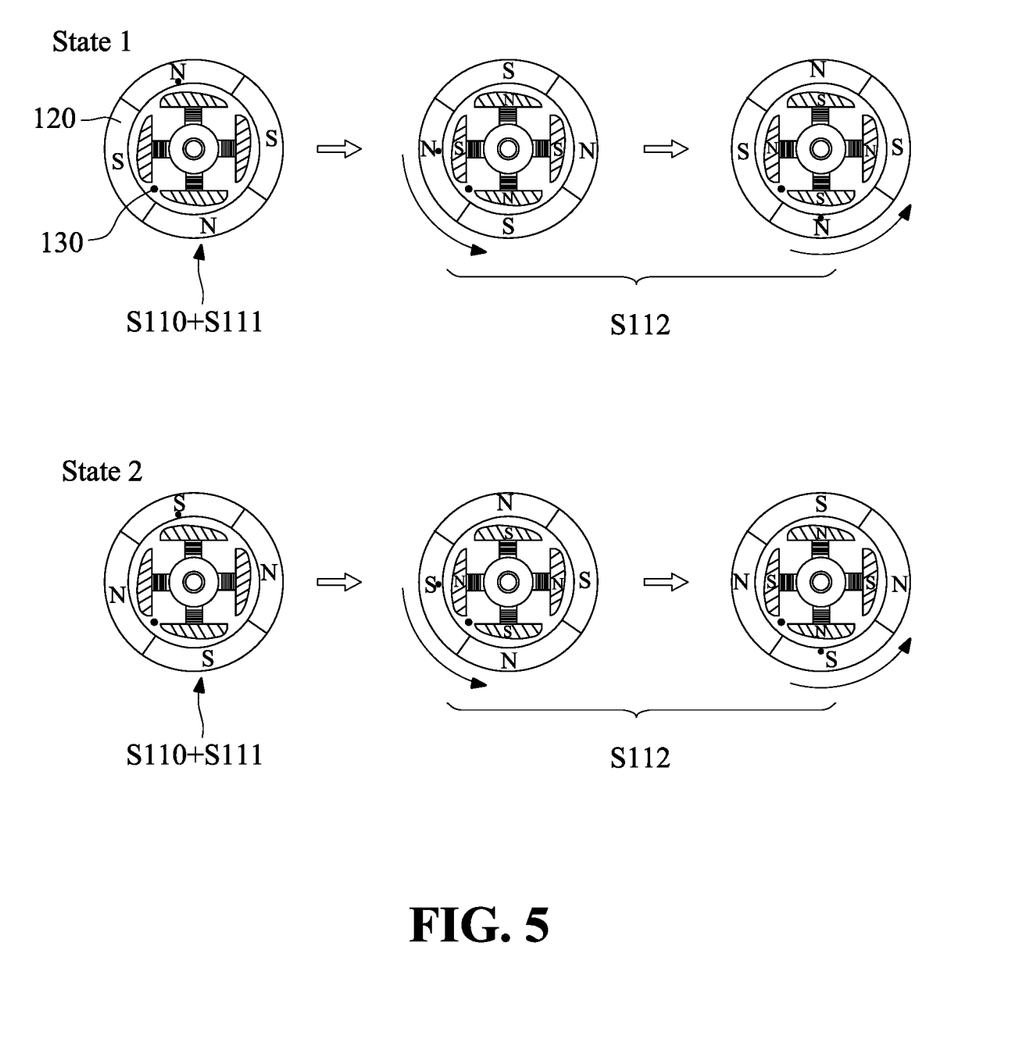
FIG. 5 shows a schematic view of the static start-up procedure in the driving method for single-phase DC brushless motor using sensor only in start-up of the present invention.
Figure 6:
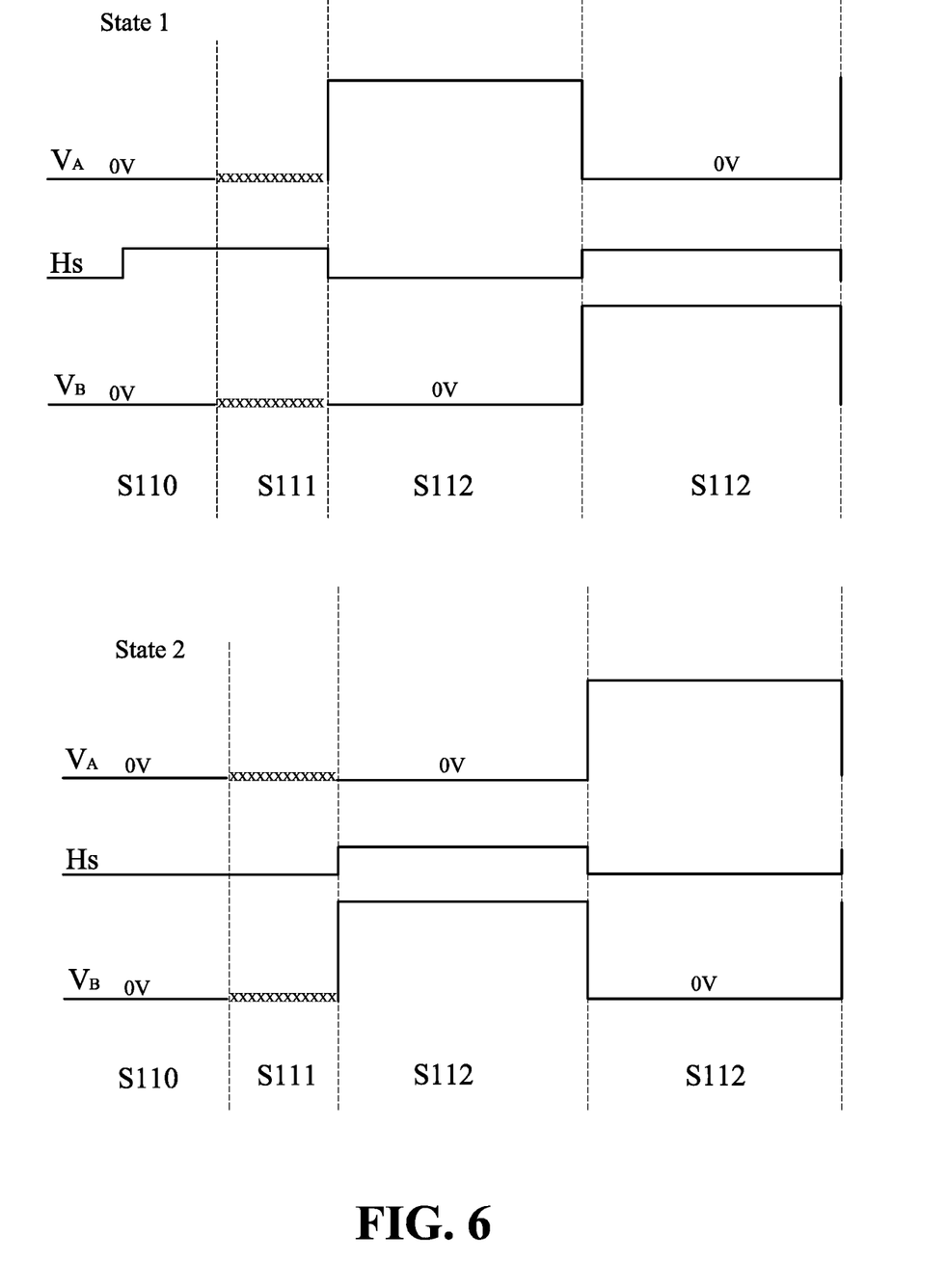
FIG. 6 shows a schematic view of the control waveform for the motor terminal in the static start-up procedure of the driving method for single-phase DC brushless motor using sensor only in start-up of the present invention.

Refer to FIG. 5 and FIG. 6. FIG. 5 shows a schematic view of the static start-up procedure in the riving method for single-phase DC brushless motor using sensor only in start-up of the present invention; FIG. 6 shows a schematic view of the control waveform for the motor terminal in the static start-up procedure of the riving method for single-phase DC brushless motor using sensor only in start-up of the present invention.

Accordingly, the static start-up procedure comprises the following steps:

Step S110: discharging remnant energy;

Step S111: confirming that the motor having no remnant energy; if yes, executing step S112; otherwise, returning to step S110;

Step S112: performing a first phase (PH1) excitation or a second phase (PH2) excitation of the motor according to the sensor detection of phase of the rotor;

Step S113: confirming an expected commutation of BEMF occurring; if so executing step S114; otherwise, executing step S115;

Step S114: confirming the first phase excitation before commutation, according to a result performing an excitation corresponding to the normal driving procedure;

Step S115: confirming whether exceeding a predetermined waiting time; if yes, return to step S110; otherwise, return to step S113.

It should be noted that the purpose of step S110 and step S111 is to completely discharge the remnant energy in the motor, including kinetic energy, magnetic energy, and electrical energy; for example, as described earlier, in a reversal rotation state in a returning wind environment, or in a forward rotation state due to residual kinetic energy or in a downwind state. Therefore, whether the execution of the method proceeds to this step from step 102 (the motor is in a stationary state) or from step S104 (the rotation of the motor does not conform to the predetermined direction), the motor no longer has remnant energy after step S110 and step S111. Wherein, the specific manner of detecting the complete discharge of the remnant energy in the motor can be realized by detecting whether the terminal voltage is $V_A=V_B=0$. At this point, the method of the present invention enters a procedure for starting the motor from an approximately stationary state.

First, the first phase (PH1) excitation or the second phase excitation is performed in step S112 according to the rotor phase detected by the sensor. As shown in FIG. 5, when the motor is stationary, the magnetic poles of the rotor 120 can be detected by the position of the sensor 130 of Hall device, for example, state 1 is S pole and state 2 is N pole. Then, the first phase excitation or the second phase excitation is selected to be performed. A preferred embodiment would be: if state 1, the first phase excitation is performed, followed by the second phase excitation so that the rotor has higher rotation speed and generates stronger BEMF signal. If state 2, the second phase excitation is performed, followed by the first phase excitation. Wherein, the number of commutation excitations is to increase the rotation speed of the rotor and to generate a stronger BEMF signal, and therefore is not limited to the present embodiment. Also, the excitation is defined as an excitation voltage is provided by the aforementioned controller to the terminal of the single-phase DC brushless motor. Therefore, in the present embodiment, the first phase excitation means that the controller provides an excitation voltage to the A terminal of the motor, and the second phase excitation means that the controller provides an excitation voltage to the B terminal of the motor. The provision of different levels of excitation to different phases makes the rotor generate a rotation in the predetermined direction.

Step S113 is to confirm whether the motor has an expected BEMF signal of a commutation condition; if so, the motor has successfully started to rotate according to the predetermined direction, and thus the method of the present invention executes step S114; otherwise, step S115 is executed to confirm whether the predetermined waiting time is exceeded; if yes, return to step S110, re-execute the entire static start-up procedure, and then completely discharge the remnant energy of the motor; otherwise, return to step S113 to confirm whether the motor is expected to be commutation to occur.

Step S114 is to confirm the first phase excitation before commutation; if so, the second phase excitation of the normal driving procedure is executed; otherwise, he first phase excitation of the normal driving procedure is executed. As such, the corresponding excitation in the normal driving procedure is entered and the normal driving procedure is executed. Herein, step S114 the first phase excitation in the present embodiment is only an exemplary, and the second phase excitation can be also used instead, and the subsequent operations are changed accordingly.

Accordingly, the normal driving procedure further comprises the following steps:

Step S120: waiting for commutation;

Step S121: performing first phase excitation;

Step S122: waiting for commutation;

Step S123: performing second phase excitation.

It should be noted that the specific implementation manner of waiting for commutation in step S120 and step S122 can be implemented by detecting whether the terminal voltage difference $V_A-V_B$ is 0. The steps of performing the first phase excitation and the performing the second phase excitation in steps S121 and S123 respectively means that the controller 200 sequentially provides an excitation voltage to the two terminals A, B of the motor; and steps S120-S123 form a loop; that is, the normal driving procedure comprises the cycle of repeating steps S120-S123. Specifically, in the step S114 of the above-described static start-up procedure, if the motor has an expected commutation condition, the method proceeds to step S121 in the normal driving procedure; in other words, the method enters the cycle of the commutation excitation.

Figure 7:
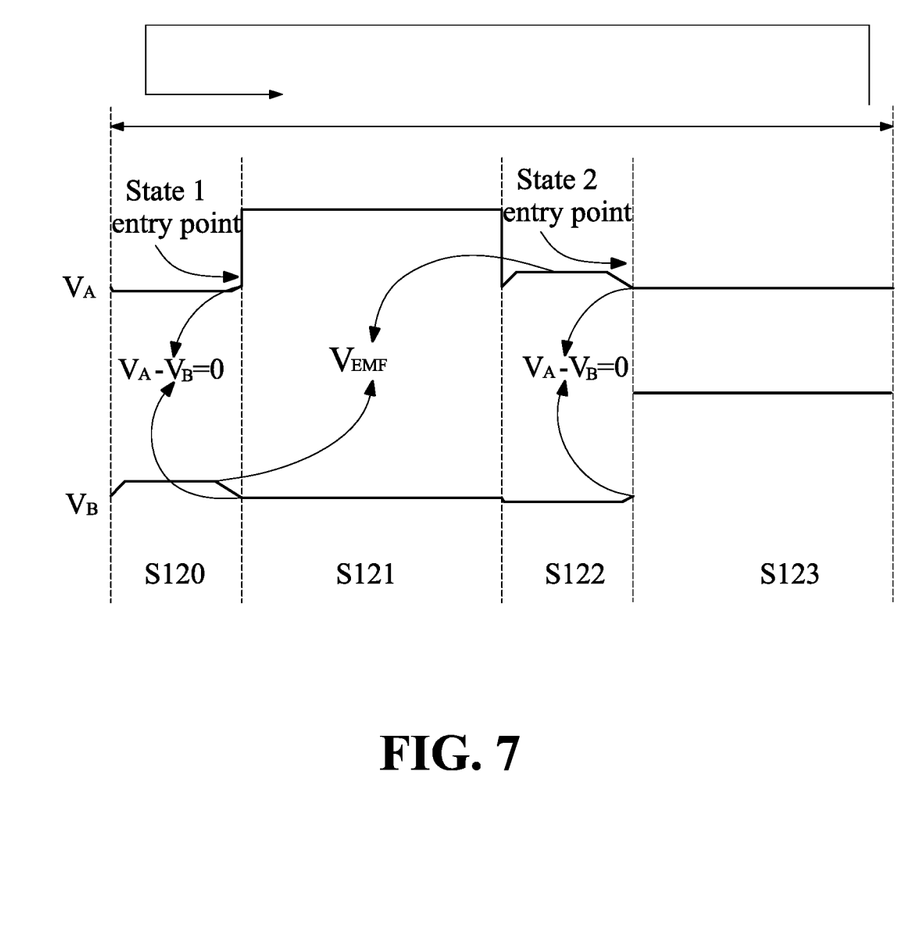
FIG. 7 shows schematic view of the e control waveform for the motor terminal in the normal driving procedure of the driving method for single-phase DC brushless motor using sensor only in start-up of the present invention.

Referring to FIG. 7, FIG. 7 shows schematic view of the e control waveform for the motor terminal in the normal driving procedure of the driving method for single-phase DC brushless motor using sensor only in start-up of the present invention. Also referring to FIG. 6, steps S120-S123 form a loop, and the specific embodiment of waiting for commutation in steps S120 and S122 can be implemented by detecting the terminal voltage difference $V_A$-$V_B$=0. Furthermore, the excitation voltage supplied by the controller 200 is equivalent to the voltage values of the two terminals A and B of the motor, as shown in step S121 and step S123.

The driving method for single-phase DC brushless motor using sensor only in start-up of the present invention may further comprise: extracting the back electromotive force signal under first phase (PH1) or the second phase (PH2) excitation periodically in the normal driving procedure to determine the slope of the back electromotive force signal to know the rotation direction because the slope of the back electromotive force signal generated by the asymmetric magnetic field is different. In other words, after step S120 or step S122, step S103 is performed to detect the slope of the back electromotive force signal to know the rotation direction of the motor, and then step S104 and the like are sequentially performed, and so on.

In summary, the present invention utilizes an asymmetric magnetic field caused by a mechanism between a rotor and a stator of a motor to induce a back electromotive force signal, and discloses a driving method for single-phase DC brushless motor using sensor only in start-up, comprising: powering up to activate a motor control circuit of a motor; confirming whether the motor is in a rotating state before activation of an excitation? If not, executing a static start-up procedure of using a sensor to detect magnetic poles of the rotor; calculating a slope of the BEMF signal to determine the rotation direction of the motor; determining whether the rotation direction of the motor conforming to a predetermined direction; if yes, executing a normal driving procedure; otherwise, executing the static start-up procedure of using a sensor to detect magnetic poles of the rotor. In the normal driving procedure, the back electromotive force signal under first phase (PH1) or the second phase (PH2) excitation is extracted periodically in the normal driving procedure to determine the slope of the back electromotive force signal to know the rotation direction.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A driving method for single-phase DC brushless motor using sensor only in start-up, comprising the following steps:
    Step S101: powering up to activate a motor control circuit of a motor;
    Step S102: confirm whether the motor is in a rotating state before activation of an excitation? If yes, proceed to step S103; otherwise, executing a static start-up procedure of using a sensor to detect magnetic poles of the rotor;
    Step S103: calculating a slope of the BEMF signal to determine the rotation direction of the motor;
    Step S104: determining whether the rotation direction of the motor conforming to a predetermined direction; if yes, executing a normal driving procedure; otherwise, executing the static start-up procedure of using a sensor to detect magnetic poles of the rotor.

2. The driving method for single-phase DC brushless motor using sensor only in start-up as claimed in claim 1, wherein in step S102, the step of confirming whether the motor being in a rotating state before activation of an excitation is realized by measuring whether an induced back electromotive force (a terminal voltage difference between two terminals of the motor) is greater than a predetermined threshold; if the terminal voltage difference of the two terminals of the motor is greater than the predetermined threshold, the motor is determined to be in a rotating state.

3. The driving method for single-phase DC brushless motor using sensor only in start-up as claimed in claim 1, wherein based on waveform of the back electromotive force signal, when left peak of the waveform is lower than the right peak, the back electromotive force signal has a positive slope, indicating that the rotation direction is clockwise; conversely, when the left peak is higher than the right peak, the back electromotive force signal has a negative slope, indicating that the rotation direction is counterclockwise.

4. The driving method for single-phase DC brushless motor using sensor only in start-up as claimed in claim 1, wherein the sensor is a Hall device.

5. The driving method for single-phase DC brushless motor using sensor only in start-up as claimed in claim 3, wherein the normal driving procedure comprises:
    Step S120: waiting for commutation;
    Step S121: performing first phase excitation;
    Step S122: waiting for commutation;
    Step S123: performing second phase excitation.

6. The driving method for single-phase DC brushless motor using sensor only in start-up as claimed in claim 5, wherein in steps S121 and S123, the excitation voltages of the same magnitude and opposite directions are provided to the motor terminals in the first phase excitation and the second phase excitation.

7. The driving method for single-phase DC brushless motor using sensor only in start-up as claimed in claim 5, wherein in steps S120 and S122, the step of waiting for commutation is realized by detecting whether or not the terminal voltage difference between the two terminals of the motor is zero.

8. The driving method for single-phase DC brushless motor using sensor only in start-up as claimed in claim 5, wherein steps S120-123 form a cyclic loop.

9. The driving method for single-phase DC brushless motor using sensor only in start-up as claimed in claim 1, further comprises: extracting a first phase or a second phase BEMF signal periodically in the normal driving procedure, and determining a slope of the BEMF signal to determine the rotation direction of the motor.

10. The driving method for single-phase DC brushless motor using sensor only in start-up as claimed in claim 5, wherein the static start-up procedure comprises:
    Step S110: discharging remnant energy;
    Step S111: confirming that the motor having no remnant energy; if yes, executing step S112; otherwise, returning to step S110;
    Step S112: performing a first phase (PH1) excitation or a second phase (PH2) excitation of the motor according to the sensor detection of phase of the rotor;
    Step S113: confirming an expected commutation of BEMF occurring; if so executing step S114; otherwise, executing step S115;

Step S114: confirming the first phase excitation before commutation, according to a result performing an excitation corresponding to the normal driving procedure;

Step S115: confirming whether exceeding a predetermined waiting time; if yes, return to step S110; otherwise, return to step S113.

\* \* \* \* \*